United States Patent
Wang et al.

(10) Patent No.: US 8,715,094 B2
(45) Date of Patent: May 6, 2014

(54) HOLLOW TRANSMISSION SHAFT

(75) Inventors: Jingfu Wang, Jinan (CN); Xinhua Diao, Jinan (CN); Lijun Wang, Jinan (CN)

(73) Assignee: Shandong Zhongtai New Energy Group Co., Ltd, Jinan (CN)

( * ) Notice: Subject to any disclaimer, the term of this patent is extended or adjusted under 35 U.S.C. 154(b) by 0 days.

(21) Appl. No.: 13/700,931

(22) PCT Filed: Nov. 3, 2011

(86) PCT No.: PCT/CN2011/081759
§ 371 (c)(1),
(2), (4) Date: Nov. 29, 2012

(87) PCT Pub. No.: WO2012/062177
PCT Pub. Date: May 18, 2012

(65) Prior Publication Data
US 2013/0079166 A1    Mar. 28, 2013

(30) Foreign Application Priority Data
Nov. 12, 2010  (CN) .......................... 2010 1 0541577

(51) Int. Cl.
*F16C 3/02* (2006.01)
(52) U.S. Cl.
USPC ........................................... 464/183; 290/55
(58) Field of Classification Search
CPC ........ F16C 3/02; F16C 3/026; F16F 15/1442; F15D 1/04; F03D 1/04
USPC .............. 464/180, 181, 183; 138/37–40, 174; 290/55
See application file for complete search history.

(56) References Cited

U.S. PATENT DOCUMENTS

| | | | | |
|---|---|---|---|---|
| 1,833,876 A | * | 11/1931 | McGrath | ...................... 138/38 X |
| 4,559,998 A | * | 12/1985 | Counterman | ............... 138/38 X |
| 6,409,606 B1 | | 6/2002 | Nakajima et al. | |
| 7,214,135 B2 | * | 5/2007 | Laskey et al. | ................. 464/180 |
| 2005/0043105 A1 | | 2/2005 | Campbell et al. | |

FOREIGN PATENT DOCUMENTS

CN    2236597    10/1996
CN    201393124    1/2010

OTHER PUBLICATIONS

Wagner et al, "Tubing," Universal Joint and Driveshaft Design Manual, AE-7, Chapter 4, Society of Automotive Engineers, Inc., Warrendale, PA, pp. 177-181, TJ1079.S62 1979.*
International Search Report for PCT International Application No. PCT/CN2011/081759 dated Mar. 1, 2012 (including English translation).

* cited by examiner

*Primary Examiner* — Gregory Binda
(74) *Attorney, Agent, or Firm* — Foley & Lardner LLP; James F. Ewing

(57) ABSTRACT

The present disclosure provides a hollow drive shaft which may include a hollow steel pipe, a mandrel set at the center of the hollow steel pipe in an axially direction, and a spiral rib plate set between the hollow steel pipe and the mandrel. The major diameter end surface of the spiral rib plate is spirally welded on the inner diameter surface of the wall of the hollow steel pipe. The minor diameter end surface of the spiral rib plate is welded on the outer diameter surface of the mandrel. The helix angle of the spiral rib plate is 10 to 45 degrees. The helical direction of the spiral rib plate is opposite to the delivery direction of a working torque M.

9 Claims, 2 Drawing Sheets

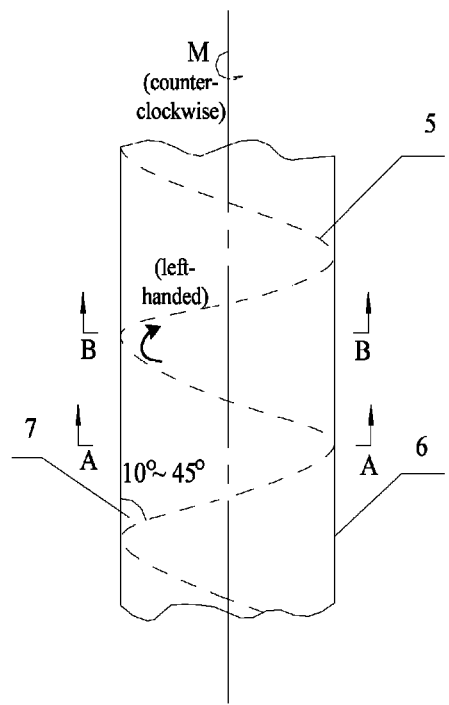
Fig. 4
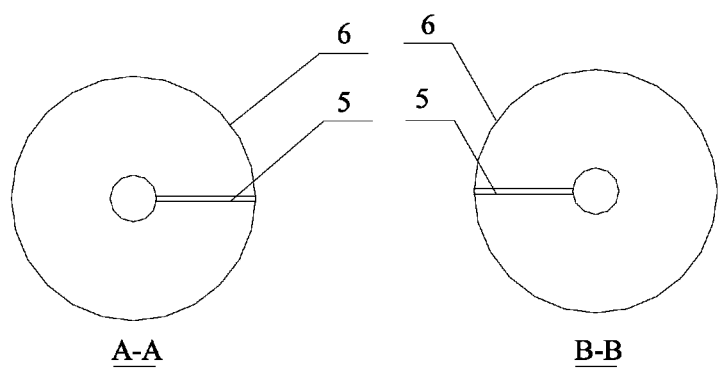
A-A
Fig. 5
B-B
Fig. 6

HOLLOW TRANSMISSION SHAFT

RELATED APPLICATIONS

The present application is a U.S. National Stage of International Application No. PCT/CN2011/081759, filed Nov. 3, 2011, which claims priority to Chinese Patent Application No. 201010541577.5, filed Nov. 12, 2010. The contents of the foregoing applications are hereby incorporated herein by reference in their entireties.

TECHNICAL FIELD

The present invention relates to power transmitting devices, and particularly to a hollow drive shaft.

BACKGROUND OF THE INVENTION

With the advent of high-power internal combustion engine, generator and motor, drive shafts for transmitting power are bound to be large-scale and capable of transmitting higher power. The biggest bottleneck of a megawatt large-scale vertical axis wind power generation system is how to enable the vertical axis of the ultra-high wind wheel power generation mechanism to transfer huge torque to the ground, and this is also a typical to-be-solved problem hindering the vertical axis wind power systems from becoming large-scale and ultra large-scale.

SUMMARY OF THE INVENTION

In order to solve the problem of lacking a drive shaft capable of transferring high power torque, embodiments of the present invention provide a hollow drive shaft which is light in weight, has good mechanical properties such as anti-bending, anti-torsion and can support large-scale vertical axis wind power generation systems.

The technical scheme of an embodiment of the present invention is as follows. A hollow drive shaft may include a hollow steel pipe, a mandrel set at the center of the hollow steel pipe axially, and a spiral rib plate set between the hollow steel pipe and the mandrel. The major diameter end surface of the spiral rib plate is spirally joined with the inner diameter surface of the wall of the hollow steel pipe wall by welding, casting, rolling, etc. The minor diameter of the spiral rib plate is spirally joined with the outer diameter end surface of the mandrel. The helix angle of the spiral rib plate is between 10 to 45 degrees. The direction of the helix angle of the spiral rib plate is opposite to the delivery direction of the working torque M. The hollow steel pipe may be a diameter variable pipe.

The technical scheme of another embodiment of the present invention is as follows. A hollow drive shaft may include a hollow steel pipe, a spiral rib plate set within the hollow steel pipe; wherein an major diameter end surface of the spiral rib plate is spirally joined with an inner diameter surface of a pipe wall of the hollow steel pipe, the direction of a helix angle of the spiral rib plate is opposite to the delivery direction of a working torque M.

The present invention has the following merits: unlike a solid shaft or a conventional hollow drive shaft, the hollow drive shaft provided by embodiments of the present invention has an anti-torque spiral rib plate fixed within it, which can replace a solid shaft or reduces the thickness needed for the wall of the hollow drive shaft, remarkably reduces the axial force generated by the weight of the large-scale vertical axis, reduces the weight of the drive shaft and reduces the manufacturing cost. Especially, the direction of the helix angle of the spiral rib plate is opposite to the delivery direction of the working torque M, which takes full advantage of the anti-bending and anti-torsional characteristics of the spiral rib plate thus generates an anti-bending and anti-torsional performance 5-10 times better than that of tubular parts of the same diameter, thickness and material. As calculated, a hollow drive shaft without the spiral rib plate has a maximum torque of 1200 KN·m, and after an anti-torque spiral rib plate is set in the hollow drive shaft, the maximum torque is increased to 5800 KN·m. Therefore, it is a good solution to the technical problem of a drive shaft transmitting large torque and a guarantee for promoting the use of large-scale vertical axis wind power generating apparatus.

Embodiments of the present invention can be applied to various types of ship propeller power transmission, power transmission of large-scale transport vehicles, as well as various high-power torque power transmission used in manufacturing equipments used in iron and steel, petroleum, mining and other sectors. It can be predicted that the invention will make a significant contribution to manufacturing of larger equipments and to ultra-large power transmission.

BRIEF DESCRIPTION OF THE DRAWINGS

FIG. 4 is a schematic diagram illustrating a structure of a hollow drive shaft according to an embodiment of the present invention.

FIG. 5 is a sectional view of FIG. 4 through line A-A.
FIG. 6 is a sectional view of FIG. 4 through line B-B.
In the above figures: 1. mandrel, 2. spiral rib plate, 3. hollow steel pipe, 4. helix angle, 5. spiral rib plate, 6. hollow steel pipe, 7. helix angle.

EMBODIMENTS OF THE INVENTION

Figure 1:
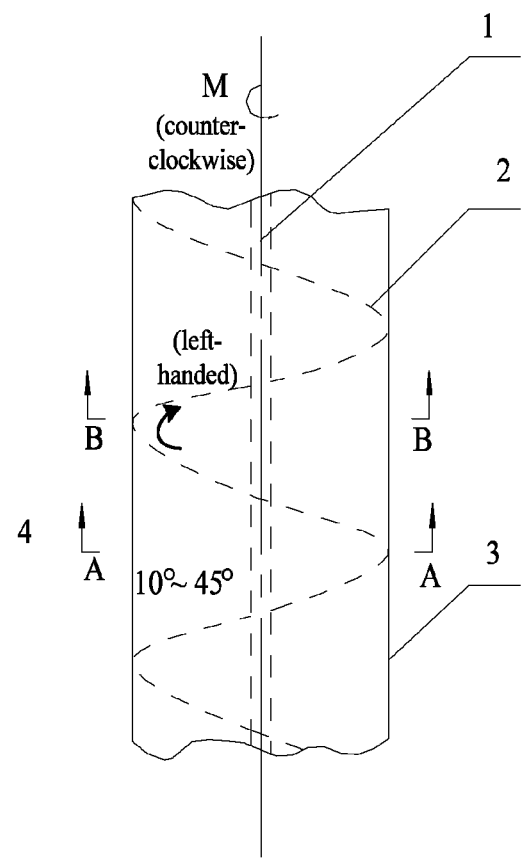
FIG. 1 is a schematic diagram illustrating a structure of a hollow drive shaft according to an embodiment of the present invention.

A few examples are further described in detail with reference to the accompanying drawings as well as embodiments so as to make the objective, technical solution and merits thereof more apparent.

If a solid shaft having a diameter of about two meters and a height of above a hundred meters is adopted for power transmission, the heavy weight of the solid shaft makes it difficult to drive the shaft to rotate, let alone to transfer a high power torque. If a hollow pipe is used as the drive shaft of a center sail mast structure, a hollow steel pipe having a diameter of tens of millimeters and a length of several meters can only transfer a torque of several kilowatts, and still can not meet the demands of large-scale vertical axis wind power generation systems.

According to an embodiment of the present invention, a hollow drive shaft having an anti-torque spiral rib plate may include a hollow steel pipe, a mandrel set at the center of the hollow steel pipe axially, and a spiral rib plate set between the hollow steel pipe and the mandrel. The major diameter end surface of the spiral rib plate is spirally joined with the inner diameter surface of the hollow steel pipe. The minor diameter end surface of the spiral rib plate is spirally joined with the outer diameter surface of the mandrel. The direction of the helix angle of the spiral rib plate is opposite to the delivery direction of a working torque M. The hollow steel pipe may be a diameter variable pipe.

The major diameter end surface of the spiral rib plate may be joined with the inner diameter surface of the wall of the hollow steel pipe by welding, casting, rolling, etc.

The helix angle of the spiral rib plate may be between 10 degrees and 45 degrees.

The hollow steel pipe may be a diameter variable steel pipe.

Unlike a solid shaft or a conventional hollow drive shaft, the hollow drive shaft provided by embodiments of the present invention has an anti-torque spiral rib plate fixed within it, which can reduce the thickness needed for the wall of the hollow drive shaft, remarkably reduce the axial force generated by the weight of the large vertical axis, reduce the weight of the drive shaft and reduce the manufacturing cost. Especially, the direction in which the spiral rib plate winds upwards is opposite to the working torque M, which takes full advantage of the anti-bending and anti-torsional characteristics of the spiral rib plate thus increases the anti-bending and anti-torsional performance of tubular parts of the same diameter, thickness and material by 5-10 times. As calculated, a hollow drive shaft without the spiral rib plate has a maximum torque of 1200 KN·m, and after an anti-torque spiral rib plate is set in the hollow drive shaft, the maximum torque is increased to 5800 KN·m. Therefore, it is a good solution to the technical problem of a drive shaft transmitting a large torque and is a guarantee for promoting the use of large-scale vertical axis wind power generating apparatus.

Embodiments of the present invention can be applied to various types of ship propeller power transmission, power transmission of large-scale transport vehicles, as well as various high-power torque power transmission used in manufacturing equipments used in iron and steel, petroleum, mining and other sectors. It can be predicted that the invention will make a significant contribution to manufacturing of larger equipments and to ultra-large power transmission.

The present invention will be described further with reference to a detailed example.

Figures 2, 3:
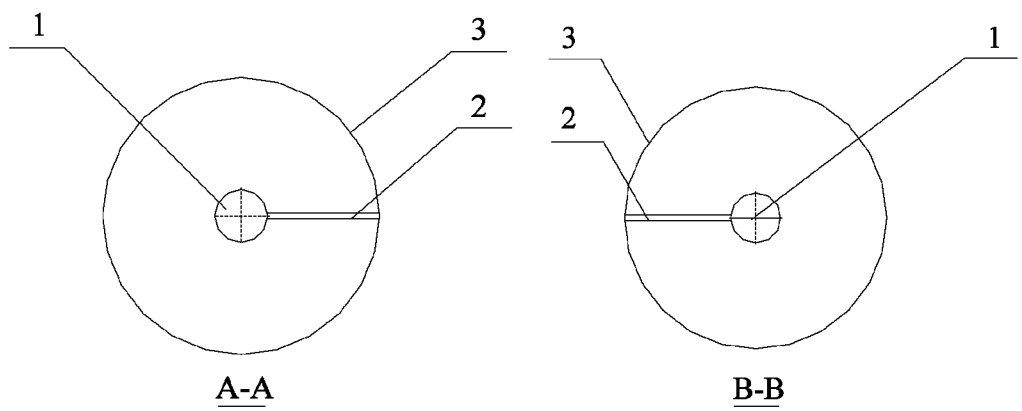
FIG. 2 is a sectional view of FIG. 1 through line A-A.
FIG. 3 is a sectional view of FIG. 1 through line B-B.

FIGS. 1, 2 and 3 illustrate a hollow drive shaft with an anti-torque spiral rib plate which can be used in a large-scale vertical axis wind power generating apparatus. The height of the drive shaft is about 100 m, the material is Q345, the diameter of the bottom of the shaft is about 3.5 m, the diameter of the top of the shaft is about 1.1 m. The shaft is composed of a diameter-variable hollow steel pipe 3 whose thickness is not equal at the bottom and at the top. The thickness of the hollow steel pipe 3 is about 80 mm at the bottom and about 15 mm at the top. A mandrel 1 is set at the center of the hollow steel pipe 3 axially. A spiral rib plate 2 is set between the mandrel 1 and the hollow steel pipe 3. The helix angle α of the spiral rib plate 2 is about 16.5°. The major diameter end surface of the spiral rib plate 2 is fully welded with the minor diameter surface of the wall of the hollow steel pipe 3. The minor diameter end surface of the spiral rib plate 2 is fully welded with the outer diameter surface of the mandrel 2. The direction of the helix angle 4 of the spiral rib plate 2 is opposite to the delivery direction of the working torque M. The maximum torque of the drive shaft 2 is about 5800 KN·m.

According to an embodiment, the diameter of the mandrel is larger than or equal to 1/10 of the outer diameter of the hollow steel pipe.

According to an embodiment, the thickness of the spiral rib plate is larger than or equal to 1/3 of the thickness of the hollow steel pipe.

FIG. 4 is a schematic illustrating a structure of a hollow drive shaft according to an embodiment of the present invention. As shown in FIG. 4, the hollow drive shaft includes a hollow steel pipe 6, a spiral rib plate 5 set within the hollow steel pipe 6. The major diameter end surface of the spiral rib plate 5 is spirally joined with the inner diameter surface of the pipe wall of the hollow steel pipe 6. The direction of the helix angle of the spiral rib plate 5 is opposite to the delivery direction of the working torque M.

The major diameter end surface of the spiral rib plate 5 may be joined with the inner diameter surface of the pipe wall of the hollow steel pipe by welding, casting, rolling, and etc. The helix angle 7 of the spiral rib plate 5 may be about 10 to 45 degrees.

The hollow steel pipe 6 may be a diameter variable hollow steel pipe.

The thickness of the spiral rib plate 5 is larger than or equal to 1/3 of the thickness of the wall of the hollow steel pipe 6.

In this embodiment, the hollow drive shaft does not have a mandrel set within it, i.e., the mandrel is not necessary in implementing the present invention. The spiral rib plate is set on the inner diameter surface of the wall of the hollow steel pipe just like circular stairs within a building.

The foregoing descriptions are only preferred embodiments of this invention and are not for use in limiting the protection scope thereof. Any modification, equivalent replacement and improvement made under the principle of the present invention should be included in the protection scope thereof.

The invention claimed is:

1. A hollow drive shaft, comprising:
a hollow steel pipe (6), and
a spiral rib plate (5) set within the hollow steel pipe (6);
wherein a major diameter end surface of the spiral rib plate (5) is spirally fully welded with an inner diameter surface of a pipe wall of the hollow steel pipe (6), a helical direction of the spiral rib plate (5) is opposite to a delivery direction of a working torque M.

2. The hollow drive shaft of claim 1, wherein the helix angle (7) of the spiral rib plate (5) is 10 to 45 degrees.

3. The hollow drive shaft of claim 1, wherein the hollow steel pipe (6) is a diameter variable hollow steel pipe.

4. The hollow drive shaft of claim 1, wherein the thickness of the spiral rib plate (5) is larger than or equal to 1/3 of the thickness of the hollow steel pipe (6).

5. A hollow drive shaft, comprising
a hollow steel pipe (3),
a mandrel (1) set at the center of the hollow steel pipe (3) axially, and
a spiral rib plate (2) set between the hollow steel pipe (3) and the mandrel (1);
wherein a major diameter end surface of the spiral rib plate (2) is fully welded with an inner diameter surface of the wall of the hollow steel pipe (3), the minor diameter end surface of the spiral rib plate (2) is fully welded with an outer diameter surface of the mandrel (1), a helical direction of the spiral rib plate (2) is opposite with a delivery direction of a working torque M.

6. The hollow drive shaft of claim 5, wherein the helix angle (4) of the spiral rib plate (2) is 10 to 45 degrees.

7. The hollow drive shaft of claim 5, wherein the hollow steel pipe (3) is a diameter variable hollow steel pipe.

8. The hollow drive shaft of claim 5, wherein the diameter of the mandrel (1) is larger than or equal to 1/10 of the outer diameter of the hollow steel pipe (3).

9. The hollow drive shaft of claim 5, wherein the thickness of the spiral rib plate (2) is larger than or equal to 1/3 of the thickness of the hollow steel pipe (3).

* * * * *